US012749144B2

(12) United States Patent
Zhan et al.

(10) Patent No.: US 12,749,144 B2
(45) Date of Patent: Sep. 29, 2026

(54) METHOD FOR DISPLAYING INFORMATION, ELECTRONIC DEVICE AND STORAGE MEDIUM

(71) Applicant: SHENZHEN SMARTSAFE TECH CO., LTD., Shenzhen (CN)

(72) Inventors: Wei Zhan, Shenzhen (CN); Hongbo Yu, Shenzhen (CN); Subin Wen, Shenzhen (CN)

(73) Assignee: SHENZHEN SMARTSAFE TECH CO., LTD., Shenzhen (CN)

( * ) Notice: Subject to any disclaimer, the term of this patent is extended or adjusted under 35 U.S.C. 154(b) by 0 days.

(21) Appl. No.: 18/714,371

(22) PCT Filed: Dec. 14, 2023

(86) PCT No.: PCT/CN2023/138815
§ 371 (c)(1),
(2) Date: May 29, 2024

(87) PCT Pub. No.: WO2024/146348
PCT Pub. Date: Jul. 11, 2024

(65) Prior Publication Data

US 2026/0170602 A1 Jun. 18, 2026

(30) Foreign Application Priority Data

Jan. 6, 2023 (CN) ......................... 202310018083.6

(51) Int. Cl.
*G06T 3/40* (2024.01)
*G06T 3/20* (2006.01)

(52) U.S. Cl.
CPC . *G06T 3/40* (2013.01); *G06T 3/20* (2013.01)

(58) Field of Classification Search
CPC ......... G06T 3/40; G06T 3/20; G06T 2200/24; H04N 23/631
See application file for complete search history.

(56) References Cited

U.S. PATENT DOCUMENTS 9,454,290 B1 9/2016 Ma et al.
2004/0233222 A1 11/2004 Lee et al.
(Continued)

FOREIGN PATENT DOCUMENTS

CN 105760178 A 7/2016
CN 109582424 A 4/2019
(Continued)

OTHER PUBLICATIONS

VanishMax. (Jan. 21, 2022). GitHub—VanishMax/vue-wheel-picker: Customizable iOS-like Picker with 3D wheel and all gestures supported for Vue 2. GitHub. https://github.com/VanishMax/vue-wheel-picker (Year: 2022).*
(Continued)

*Primary Examiner* — Antonio A Caschera
(74) *Attorney, Agent, or Firm* — CANTOR COLBURN LLP

(57) ABSTRACT

A method for displaying information, an electronic device and a storage medium. The method includes: obtaining a total sliding distance of an operation body, the total sliding distance is a movement distance of the operation body in a Y-axis direction of a display area where a component is located; determining an item-to-be-displayed of the component according to the total sliding distance; determining a movement distance of a canvas of the component in the Y-axis direction and a scaling rate of the canvas according to the total sliding distance and a height of the item-to-be-displayed; and controlling the canvas to perform a translational movement according to the movement distance and scaling the canvas according to the scaling rate simultaneously, drawing and displaying the item-to-be-displayed on the canvas. A three-dimensional scrolling effect of the component may be realized, and a user experience may be improved.

8 Claims, 7 Drawing Sheets

(56) References Cited

U.S. PATENT DOCUMENTS

| | | | |
|---|---|---|---|
| 2014/0359525 | A1 | 12/2014 | Weiner et al. |
| 2018/0121077 | A1 | 5/2018 | Morton |

FOREIGN PATENT DOCUMENTS

| | | | |
|---|---|---|---|
| CN | 110286827 | A | 9/2019 |
| CN | 112835484 | A | 5/2021 |
| CN | 112925593 | A | 6/2021 |
| CN | 113934337 | A | 1/2022 |
| CN | 114706508 | A | 7/2022 |
| CN | 115552364 | A | 12/2022 |
| CN | 116301532 | A | 6/2023 |

OTHER PUBLICATIONS

"A custom control, NumberPickerView, with a superior UI experience compared to NumberPicker", May 5, 2017, 18 pages.
"Implementing a native iOS picker effect using Vue (Analysis of the implementation approach)", Jun. 30, 2016, 14 pages.
CNIPA First Office Action corresponding to CN Application No. 202310018083.6; Issue date, Oct. 21, 2025, 20 pages.
International Search Report for International Application No. PCT/CN2023/138815; Mailing Date, Feb. 29, 2024.

* cited by examiner

METHOD FOR DISPLAYING INFORMATION, ELECTRONIC DEVICE AND STORAGE MEDIUM

CROSS-REFERENCE TO RELATED APPLICATIONS

This application is a 35 U.S.C. § 371 national stage application of PCT patent application No. PCT/CN2023/138815, filed on Dec. 14, 2023, which claims priority to Chinese patent application No. 202310018083.6, filed on Jan. 6, 2023, and entitled "method and apparatus for displaying information, electronic device and storage medium", the entire contents each of which is incorporated herein by reference.

TECHNICAL FIELD

The present application relates to the field of computer technologies, and more particularly, to a method for displaying information, an electronic device and a storage medium.

BACKGROUND

NumberPicker is also referred to as a numerical selection component. The numerical selection component is a component used for selecting a group of predefined values, and the user may input values through a keyboard or select values by scrolling. Currently, the NumberPicker component has been widely used in the Android system.

However, the existing NumberPicker component is still unable to meet the user's requirement, a bad user experience is caused.

SUMMARY

The present application provides a method for displaying information, an electronic device and a computer-readable storage medium, which can improve the problem of bad user experience caused because that the existing NumberPicker component is still unable to meet the requirement of the user.

In the first aspect, a method for displaying information is provided in the embodiments of the present application. The method is performed by an electronic device and includes:

obtaining a total sliding distance of an operation body, wherein the total sliding distance is a movement distance of the operation body in a Y-axis direction of a display area where a component is located, the component is a NumberPicker;

determining an item-to-be-displayed of the component according to the total sliding distance;

determining a movement distance of a canvas of the component in the Y-axis direction and a scaling rate of the canvas according to the total sliding distance and a height of the item-to-be-displayed; and controlling the canvas to perform a translational movement according to the movement distance and scaling the canvas according to the scaling rate simultaneously, and drawing and displaying the item-to-be-displayed on the canvas.

In one embodiment, said determining the movement distance of the canvas of the component in the Y-axis direction and the scaling rate of the canvas based on the total sliding distance and the height of the item-to-be-displayed includes:

determining a radian of the item-to-be-displayed based on the total sliding distance and the height of the item-to-be-displayed;

determining the movement distance of the canvas in the Y-axis direction based on the radian of the item-to-be-displayed and the height of the item-to-be-displayed; and determining the scaling rate of the canvas based on the radian of the item-to-be-displayed.

In one embodiment, said determining the radian of the item-to-be-displayed based on the total sliding distance and the height of the item-to-be-displayed includes:

determining the radian of the item-to-be-displayed according to a first formula which is expressed as:

$$\alpha = (H \times \text{counter} - totalScrollY\ \%\ H)/(H \times 2/\pi);$$

wherein, α represents the radian of the item-to-be-displayed, H represents the height of the item-to-be-displayed, totalScrollY represents the total sliding distance of the operation body in the Y-axis direction of the display area where the component is located, and counter represents a value of a drawing point.

In one embodiment, said determining the movement distance of the canvas in the Y-axis direction according to the radian of the item-to-be-displayed and the height of the item-to-be-displayed includes:

determining the movement distance of the canvas in the Y-axis direction according to a second formula which is expressed as:

$$ty = R - aO - ba;$$

wherein, ty represents the movement distance of the canvas in the Y-axis direction, $R=H\times2/\pi$, $ba=\sin(\alpha)textHeight/2$, $aO=\cos(\alpha)\times R$, or $aO=-\cos(\alpha)\times R$, textHeight represents a text height of the item-to-be-displayed.

In one embodiment, said determining the scaling rate of the canvas based on the radian of the item-to-be-displayed includes:

determining the scaling rate of the canvas according to a third formula which is expressed as:

$$scaleY = \sin(\alpha);$$

wherein scaleY represents the scaling rate of the canvas.

In one embodiment, after said controlling the canvas to perform the translational movement according to the movement distance and scaling the canvas according to the scaling rate simultaneously, and drawing and displaying the item-to-be-displayed on the canvas, the method further includes:

obtaining, if a leaving event is detected, a movement speed of the operation body on the Y-axis when the operation body leaves from the display area where the component is located, wherein the leaving event is used to indicate that the operation body leaves from the display area where the component is located;

controlling, by using the movement speed as an initial value, the canvas to perform the translational movement according to a preset deceleration until the movement speed decreases to 0.

In one embodiment, after said controlling, by using the movement speed as the initial value, the canvas to perform the translational movement according to the preset deceleration until the movement speed decreases to 0, the method further includes:

obtaining a center offset of a current item of the component;

controlling, if the center offset is greater than half of the height of the current item of the component, the canvas to perform the translational movement until the current item of the component becomes a next item, controlling the next item to be centered, and setting the next item as a selected item; or alternatively, controlling, if the center offset is less than or equal to half of the height of the current item of the component, the current item to be centered and setting the current item as the selected item.

In the second aspect, an electronic device is provided in the embodiments of the present application, the electronic device includes:

a memory, a processor and a computer program stored in the memory and executable by the processor, when the computer instruction is executed by the processor, steps of the method for displaying information according to the first aspect is implemented.

In the third aspect, a non-transitory computer-readable storage medium is provided in the embodiments of the present application, the non-transitory computer-readable storage medium includes: a computer program, when the computer program is executed by a processor, steps of the method for displaying information according to the first aspect is implemented.

In the fourth aspect, a computer program product is provided in the embodiments of the present application, when the computer program product is executed by the electronic device, the electronic device is caused to perform the steps of the method for displaying information according to the first aspect.

As compared to the related art, the beneficial effects of the embodiments of the present application are set forth below: after the movement distance of the canvas in the Y-axis direction and the scaling rate of the canvas are determined according to the total sliding distance of the operation body and the height of the item-to-be-displayed of the component, it is possible to control the canvas to make a translational movement according to the movement distance, and scale the canvas according to the scaling rate simultaneously, and draw and display the item-to-be-displayed of the component on the canvas. Thus, when the canvas makes a translational movement and is scaled, the item on the component also makes a translational movement and is scaled, the 3D scrolling effect of the component may be realized visually, thus, the user experience may be improved, and the problem of bad user experience caused because that the existing components are still unable to meet the user's requirement may be solved.

DESCRIPTION OF THE DRAWINGS

In order to describe the embodiments of the present application more clearly, a brief introduction regarding the accompanying drawings that need to be used for describing the embodiments of the present application or the existing technology is given below. It is obvious that the accompanying drawings described below are merely some embodiments of the present application, a person of ordinary skill in the art may also acquire other drawings according to the current drawings without paying creative efforts.

DETAILED DESCRIPTION OF EMBODIMENTS

Figure 1:
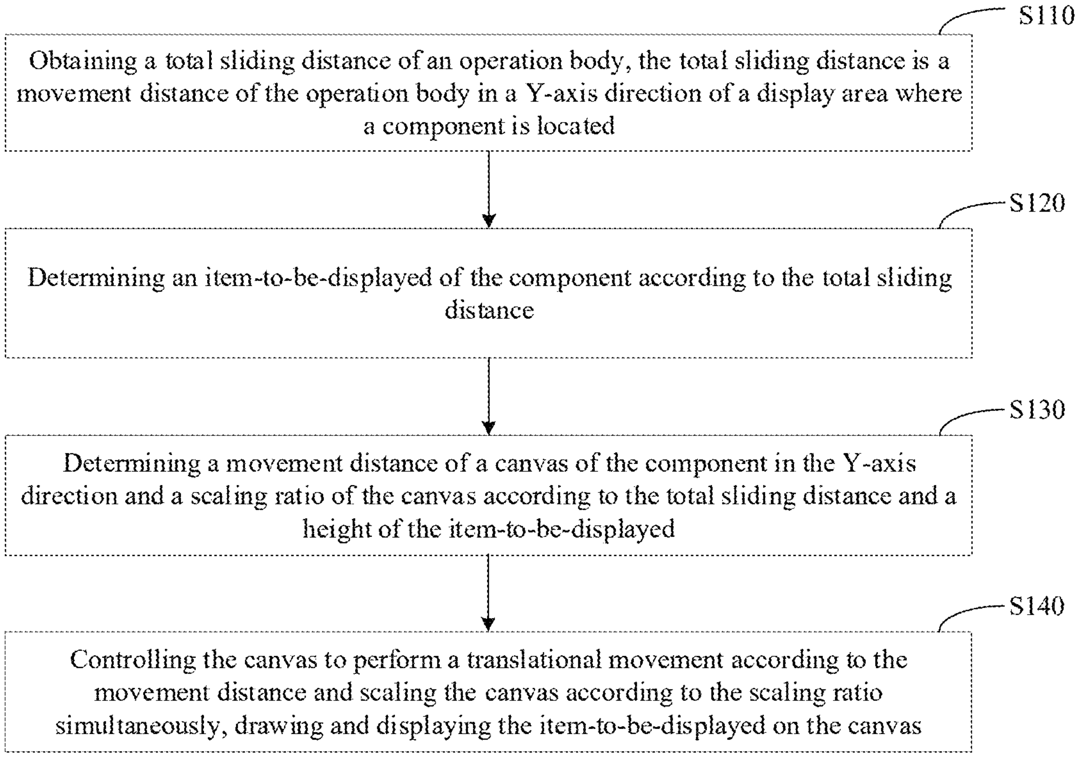
FIG. 1 illustrates a schematic flow diagram of a method for displaying information in accordance with one embodiment of the present application.

In the following descriptions, in order to describe rather than being intended to limit the present application, concrete details including specific system structure and technique are proposed to facilitate a comprehensive understanding of the embodiments of the present application. However, a person of ordinarily skill in the art should understand that, the present application can also be implemented in some other embodiments from which these concrete details are excluded. In other conditions, detailed explanations of method, circuit, device and system well known to the public are omitted. Thus, unnecessary details which are disadvantageous to understanding of the description of the present application may be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

In addition, in the descriptions of the present application, terms such as "first" and "second", "third", etc., are only used for distinguishing purpose in description, but shouldn't be interpreted as indication or implication of a relative importance.

The descriptions of "referring to one embodiment" or "referring to some embodiments", or the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise they are specially emphasize in other manner. The terms "comprising", "including", "having" and their variations mean "including but is not limited to", unless otherwise they are specially emphasized in other manner.

When a user performs numerical selection through a NumberPicker component, a three dimensional (3D) scrolling effect cannot be achieved due to the poor customization effect of the NumberPicker component. Thus, a bad user experience is caused.

In order to improve the user experience, a method for displaying information is provided in one embodiment of the present application. In this method for displaying information, after a moving distance of a canvas in a Y-axis direction and a scaling rate of the canvas are determined according to a total sliding distance of an operation body and a height of the item-to-be-displayed of the component, the canvas may be controlled to perform a translational movement according to the moving distance and be scaled according to the scaling rate simultaneously, and the item-to-be-displayed of the component is drawn and displayed on the canvas. Thus, when the canvas performs a translational movement and is scaled, an item on the component also performs a translational movement and is scaled simultaneously, the 3D scrolling effect may be achieved visually, and the user experience may be improved.

The method for displaying information in the embodiment of the present application is described hereinafter with reference to the accompanying drawings.

FIG. 1 illustrates a schematic flow diagram of the method for displaying information according to the embodiment of the present application. As shown in FIG. 1, this method includes steps S110-S140. The principle of implementation of these steps are described below:

At step S110, a total sliding distance of an operation body is obtained, the total sliding distance is a movement distance of the operation body in a Y-axis direction of a display area where a component is located.

The operation body may be a finger of the user, or be a stylus, a mouse, or the like. The operation body is not limited herein. In this embodiment of the present application, the present application is described by taking a finger of the user as the operation body as an example.

The component may be displayed in a corresponding display area of a screen. When the finger of the user performs an operation on the display area where the component is located, a information display system may automatically generate an event corresponding to the operation. For example, when it is monitored that the finger of the user is pressed on the display area where the pressing component is located, the information display system generates a touch event. When it is monitored that the finger of the user moves in the display area where the component is located, the information display system may generate a movement event. When it is monitored that the finger of the user leaves the display area where the component is located, the information display system may generate a leaving event.

In some embodiments, the information display system monitors various events, when the touch event is monitored, the information display system obtains a coordinate corresponding to the touch event, and stores the coordinate for subsequent use.

The coordinate corresponding to the touch event is the coordinate of the center of the finger when the finger of the user presses the display area where the component is located. The coordinate may be represented by X-axis coordinate, or be represented by Y-axis coordinate, or be represented by the X-axis coordinate and the Y-axis coordinate simultaneously, the representation of the coordinate is not limited herein.

In this embodiment of the present application, since the finger moves up and down in the display area where the component is located to realize the effects of rolling up the component and rolling down the component, and is only related to coordinates of the Y-axis. Thus, for brevity, the coordinate is represented by the Y-axis coordinate.

Specifically, after obtaining the Y-axis coordinate corresponding to the touch event, the information display system records the Y-axis coordinate as a first coordinate, and stores the first coordinate for subsequent use.

In some embodiments, the movement event is used to indicate that the operation body moves in the Y-axis direction of the display area where the component is located. When the movement event is monitored, the information display system may obtain the coordinate corresponding to the movement event and record the coordinate as a second coordinate.

In this embodiment of the present application, since the finger moves up and down in the display area where the component is located to realize the effects of scrolling up and scrolling down the items in the component, therefore, the finger moves in the Y-axis direction. For brevity, the second coordinate is also represented by the Y-axis coordinate.

After the second coordinate is obtained, the information display system may determine the movement distance of the finger of the user in the Y-axis direction according to the second coordinate and the first coordinate.

In particular, the information display system may obtain the moving distance generated when the finger moves in the Y-axis direction of the display area where the component is located by subtracting the second coordinate with the first coordinate and determine the summation of all moving distances to obtain the total moving distance totalScrollY of the finger.

At step S120, an item-to-be-displayed of the component is determined according to the total sliding distance.

In some embodiments, some items may be included in the component, and these items may be numerals, weather, province, or the like. The items are not limited herein.

In this embodiment of the present application, the component is a numerical selection control including numbers to be picked, that is, NumberPicker. In this embodiment of the present application, the embodiments of the present application are described by taking the NumberPicker component as the component as an example.

The item-to-be-displayed may be determined according to the total sliding distance of the finger of the user in the Y-axis direction of the display area where the NumberPicker component is located.

At step S130, a moving distance of the canvas of the component in the Y-axis direction and a scaling rate of the canvas are determined according to the total sliding distance and the height of the item-to-be-displayed.

Figure 2:
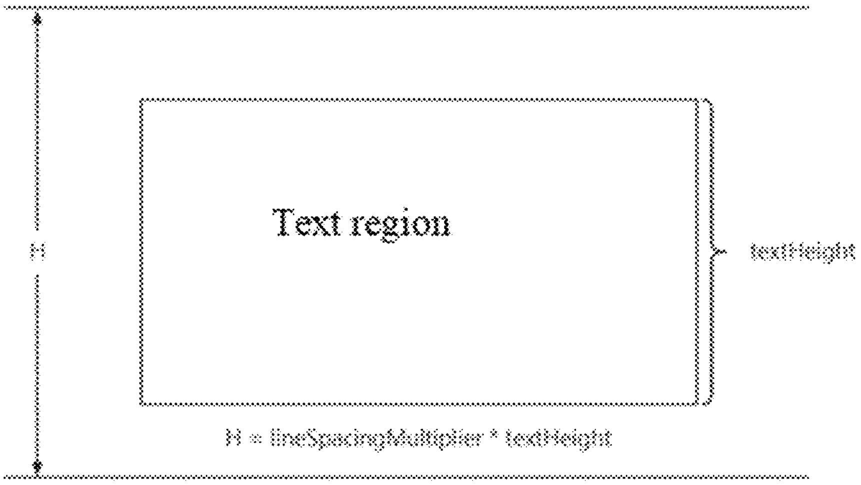
FIG. 2 illustrates a schematic diagram of a height H of each item in a NumberPicker component provided in one embodiment of the present application.

In some embodiments, a height H of each digital item in the NumberPicker component is consistent, H is determined by the product of the text height TextHeight and the text spacing multiplier lineSpacingMultiplier (as shown in FIG. 2), a width TextWidth of the component is determined by a set value and is not limited herein.

After the height H of the item-to-be-displayed of the component is obtained, the movement distance ty of the canvas in the Y-axis direction and the scaling rate ScaleY of the canvas may be calculated according to H and totalScrollY determined in the step S120.

At step S140, the canvas is controlled to perform translational movement according to the moving distance while the canvas is scaled according to the scaling rate, and the item-to-be-displayed is drawn and displayed on the canvas.

In some embodiments, the information display system may control the canvas to perform translational movement according to the moving distance obtained in the step S130, scale the canvas according to the scaling rate obtained in the step S130, draw and display the item-to-be-displayed of the component on the canvas, thereby implementing the 3D scrolling effect of the NumberPicker component.

Figure 3A:
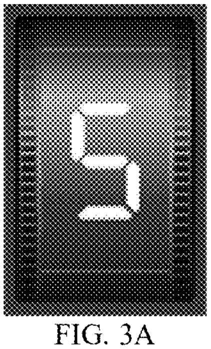
FIG. 3A illustrates a schematic diagram of a visual effect of the NumberPicker component seen by a user provided in one embodiment of the present application, when the user's finger does not move in the display area where the NumberPicker component is located.

FIG. 3A is a schematic diagram illustrating a visual effect of the NumberPicker component seen by the user when the finger of the user is not moved in the display area where the component is located.

Figure 3B:
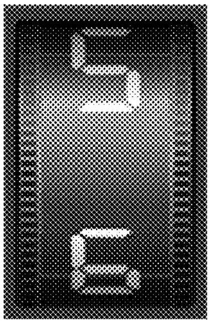
FIG. 3B illustrates a schematic diagram of a visual effect of the NumberPicker component seen by the user provided in one embodiment of the present application, when the user's finger moves in the display area where the NumberPicker component is located.

FIG. 3B is a schematic diagram of a plane display effect of the 3D scrolling effect presented by the NumberPicker component seen by the user when the user's finger moves up and down in the display area where the component is located. The position of the number "5" in FIG. 3B is ty lower than the number "5" in the FIG. 3A. Thus, the digital item "5" performs translational movement upwards while the scaling rate scaleY is increased, the digital item "5" in FIG. 3B appears to be significantly smaller than the number "5" in FIG. 3A, the displaying of the entire NumberPicker component forms a 3D visual effect.

It should be understood that, in the aforesaid steps S110-S140, after the moving distance of the canvas in the Y-axis direction and the scaling rate of the canvas are determined according to the total sliding distance of the operation body and the height of the item-to-be-displayed of the component, the canvas may be controlled to perform translational movement according to the aforesaid scaling rate while the canvas is scaled according to the aforesaid scaling rate, and the item-to-be-displayed of the component are drawn and displayed on the canvas. Thus, while the canvas performs a translational movement and is scaled, the item on the component also performs a translational movement and is scaled, the 3D scrolling effect of the component may be realized visually. Thus, the user experience may be improved, and a problem of bad user experience caused because that the existing component is still unable to meet the requirement of the user may be solved.

Figure 10:
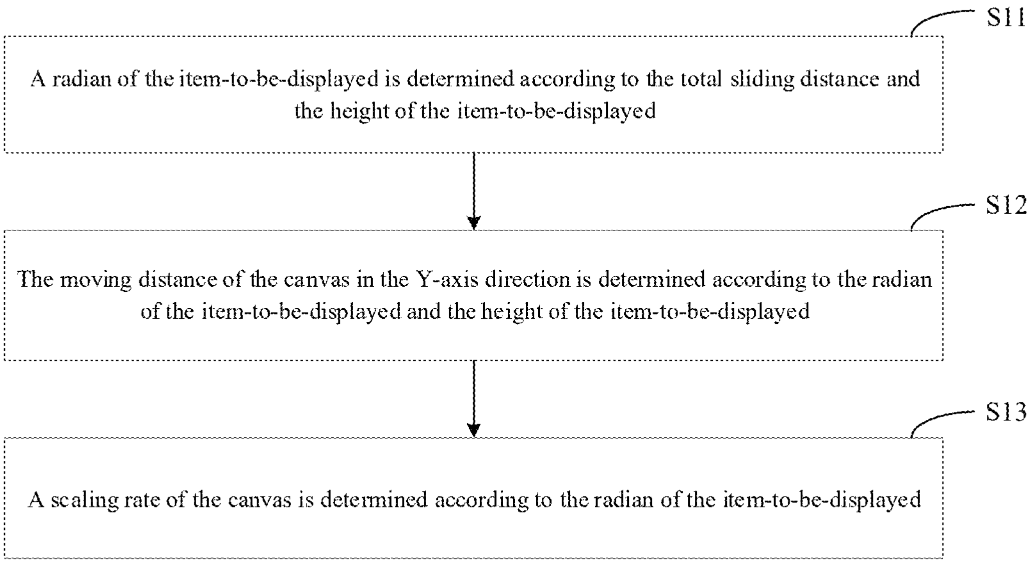
FIG. 10 illustrates details of implementation principles of the step of determining the moving distance of the canvas in the Y-axis direction and the scaling rate of the canvas according to the total sliding distance and the height of the item-to-be-displayed.

In some embodiments, on the basis of the embodiment of the method for displaying information shown in FIG. 1, the step S130 of determining the moving distance of the canvas in the Y-axis direction and the scaling rate of the canvas are determined according to the total sliding distance and the height of the item-to-be-displayed may be achieved by performing following steps. With reference to FIG. 10, the details of the implementation principles of the steps are set forth below:

At step S11, a radian of the item-to-be-displayed is determined according to the total sliding distance and the height of the item-to-be-displayed.

In some embodiments, the radian of the item-to-be-displayed may be determined according to a following first formula:

The first formula is expressed as: $\alpha=(H\times counter-totalScrollY \% H)/(H\times 2/\pi)$.

Wherein, $\alpha$ represents the radian of the item-to-be-displayed, H represents the height of the item-to-be-displayed, totalScrollY represents the total sliding distance of the finger in the Y-axis direction, counter represents the value of a starting point of drawing, the value of counter may be 0, 1, or 2.

Figure 4:
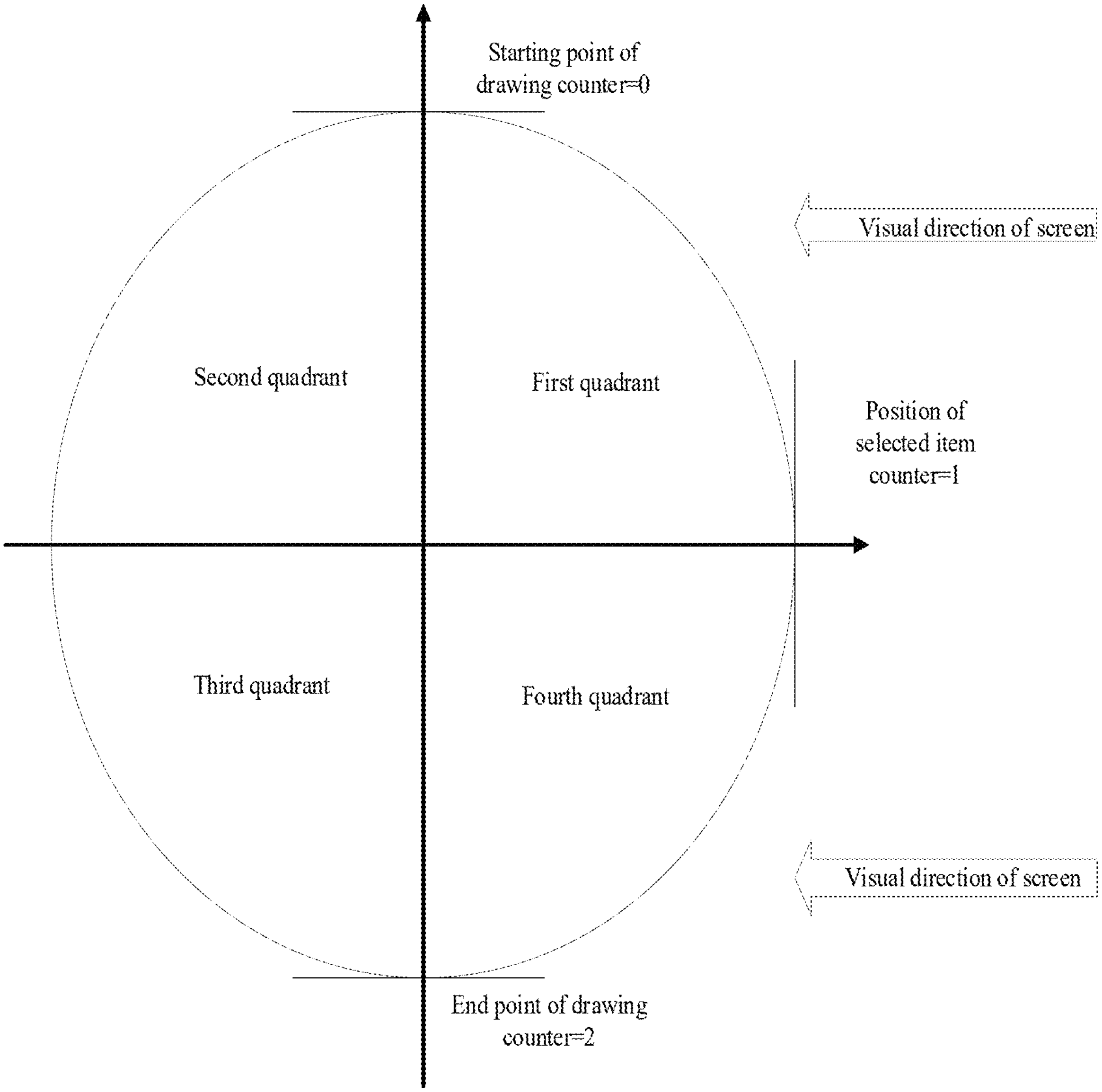
FIG. 4 illustrates a schematic diagram of a relationship between a circle and a height of the component provided in one embodiment of the present application.

The principle is described in detail below:

As shown in FIG. 4, imaging that a side surface of the component is a circle, the numerical value on the component is drawn on the arc of the circle, the circle is placed in a rectangular coordinate system, the center of the circle is aligned with the origin of the coordinate system, the visible area in a visual direction of the screen includes a first quadrant and a fourth quadrant. Three numerical items are drawn in the visible region, which are respectively the starting point of drawing, that is, counter=0, a selected item counter=1, and a end point of drawing, that is, counter=2. As shown in FIG. 2, the height H of one numerical item is determined by a text height textheight and a text spacing multiplier lineSpacingMultiplier. The text spacing multiplier may be set directly by the user, and the text height needs to be obtained through a getTextBounds method of the system after the font size of the text is set by the user. Heights of four numerical items are set to form a circumference ($C=H\times 4$) of the circle shown in FIG. 4, then, the diameter $D=C/\pi=H\times 4/\pi$ and the radius of $R=C/\pi/2=H\times 2/\pi$ of the circle may be deduced according to a circumferential length calculation formula $C=\pi D$.

The drawing principle of the component is 3D circular motion, however, in the Android system, the drawing of a customized component is still performed on the canvas of a two-dimensional plane.

The starting point of drawing is a point C (x=0, y=0) which is located at an upper left corner of the component, a horizontal right direction of the point C is the positive direction of the X axis, and a vertical downward direction of the point C is the positive direction of the Y axis.

Item is started to be drawn at the point C (0,0), each item has an offset ty on the y-axis, the value of the offset ty of the item (counter=0) at the starting point is 0 when it is in a stationary state. Thus, the item is drawn from a starting point y=0, since the height is also reduced to 0, the item of the starting point cannot be seen on the canvas. After the start point is drawn, the canvas performs translational movement downwards by the Y-axis offset of the selected item (counter=1), and the item is drawn. Finally, the canvas performs translational movement downwards by Y-axis offset of the end point item (counter=2), and the item is drawn, the height of the end point item is also reduced to 0, and thus the item cannot be seen on the canvas.

Indeed, the moving distance totalScrollY of the finger sliding on the screen in the Y-axis is not identical to the moving distance of the item on the Y-axis, there is an association relationship of angle α between the moving distance totalScrollY and the the moving distance of the item on the Y-axis.

Figure 5:
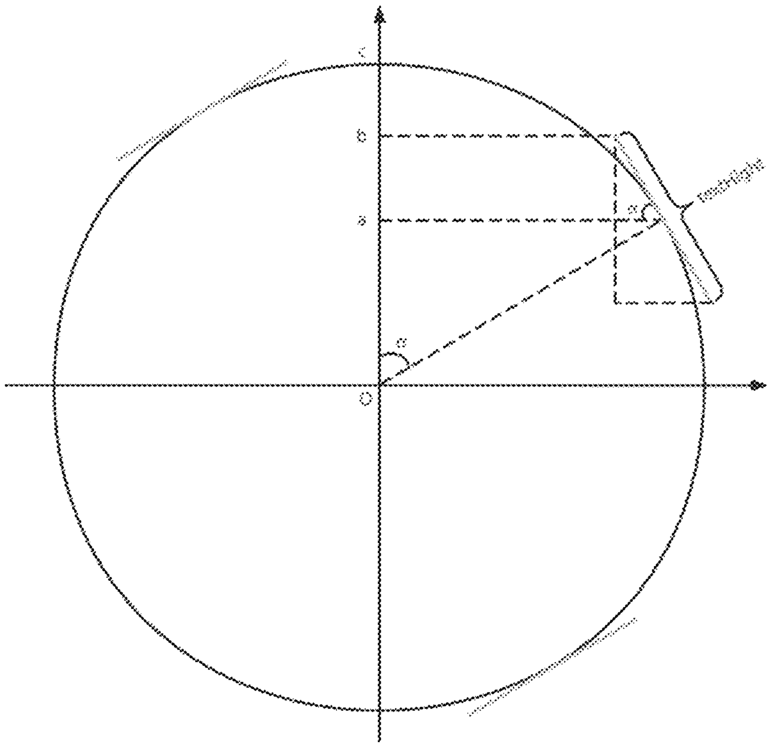
FIG. 5 illustrates a schematic diagram of a principle of calculation of the translational distance of the canvas provided in one embodiment of the present application.

As shown in FIG. 5, when the finger slides upwards on the screen by a distance totalScrollY, wherein totalScrollY is equal to an arc length from a midpoint of the item to the X axis, the offset ty of the selected item on the Y axis is reduced (i.e., the distance between point c and point b), and an angle between the midpoint of the item and the Y axis is α.

The value ty of the item may be calculated by calculating the angle α, the value ty determines the drawing position of the item on the canvas.

For example, the ty value (i.e., the distance between c and b) of the selected term (counter=1) in FIG. 5 is calculated, according to the radian calculation formula expressed as: a=L/R (arc length/radius), the arc length where α corresponds to is equal to ¼ arc length minus the length of totalScrollY, and heights H of the four items forms the circle. Thus, the length of quarter arc is equal to H. Thus, the arc length L where α corresponds to is expressed as: L=H×Counter−totalScrollY.

It is known that the R=H×2/π, thus, α=(H×counter−totalScrollY)/(H×2/π).

At step S12, the moving distance of the canvas in the Y-axis direction is determined according to the radian of the item-to-be-displayed and the height of the item-to-be-displayed.

In some embodiments, regarding the condition shown in FIG. 5, a distance between point a and point O is calculated according to a trigonometric function formula expressed as: aO=cos (α)×R. A distance between point b and point a is calculated according to a formula expressed as: ba=sin (α)×textHeight/2. Thus, the value (i.e., the distance between point c and point b) of ty is calculated according to a formula expressed as ty=R−aO−ba.

The movement distance of the canvas in the Y-axis direction may be determined according to the second formula listed below:

the second formula is expressed as: ty=R−aO−ba.

Wherein, ty represents the moving distance of the canvas in the Y-axis direction, wherein aO=cos (α)×R, ba=sin (α)×textHeight/2, and TextHeight represents the text height of the item-to-be-displayed.

Figure 6:
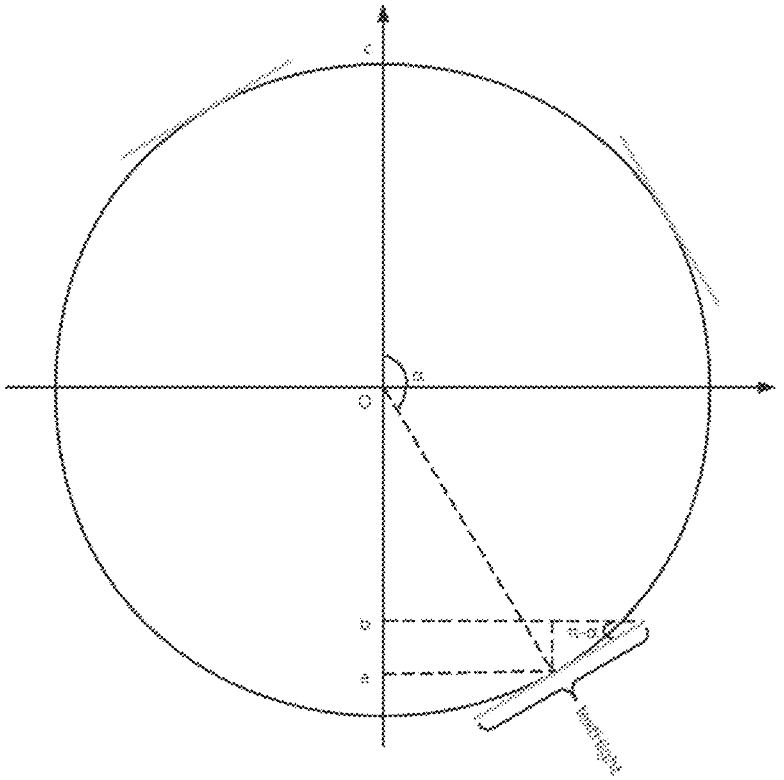
FIG. 6 illustrates a schematic diagram of a principle of calculation of the translational distance of the canvas provided in another embodiment of the present application.

Regarding the condition shown in FIG. 6, the ty value (i.e., the distance between point c and point b) of the end point of the item (counter=2) in FIG. 6 is calculated, and the angle α is obtained. Then, the distance between point a and point O is calculated according to the trigonometric function formula: cos (π−α)×R=−cos (α)×R. Finally, the distance between point b and point a is calculated according to the calculation formula: ba=sin (π−α)×textHeight/2=sin (α)×textHeight/2. Thus, the value of ty (i.e., the distance between point c and point b) is calculated according to the calculation formula: ty−R−aO−ba.

The movement distance of the canvas in the Y-axis direction may also be determined according to a second formula listed below:

the second formula is expressed as: ty=R−aO−ba:

Wherein, ty represents the moving distance of the canvas in the Y-axis direction, aO=−cos (α)×R, ba=sin (α)×textHeight/2, and textHeight represents the text height of the item-to-be-displayed.

At step S13, a scaling rate of the canvas is determined according to the radian of the item-to-be-displayed.

Figure 7:
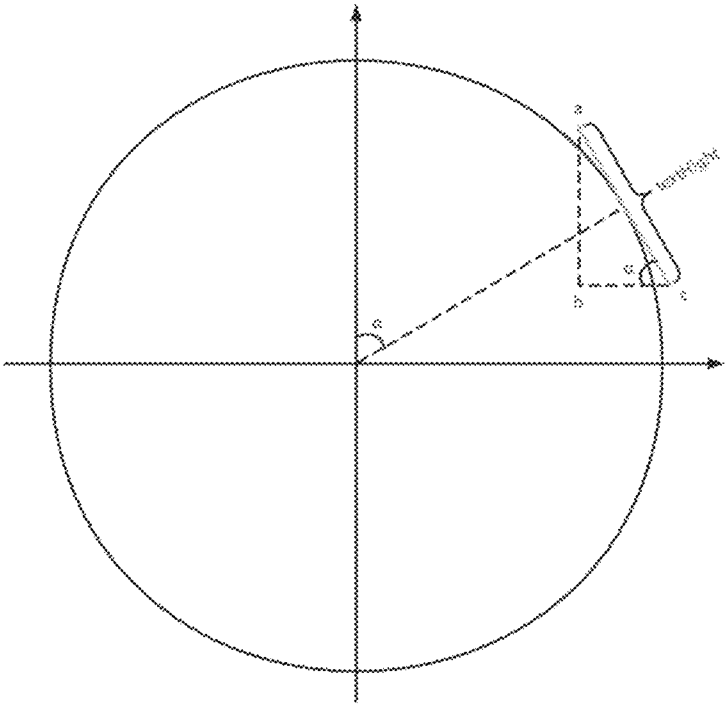
FIG. 7 illustrates a schematic diagram of a principle of calculation of a scaling rate of the canvas provided in another embodiment of the present application.

In some embodiments, the position of each item on the canvas may be determined by calculating the value of ty, the angle α is obtained according to the distance totalScrollY that the finger slides on the screen, ty is calculated according to the angle α, the position of the item is refreshed and the item is drawn again, and a visual sense of sliding upwards is generated. However, this is merely an item translation vision of the 3D scrolling effect, if a real 3D effect needs to be achieved, height scaling on the text needs to be further performed. As shown in FIG. 7, the scaling rate is ab/ac, i.e., scaleY=sin (α), and by using the canvas scaling method canvas·scale (1,y) provided by the system, height scaling of the item is enabled.

Thus, the scaling rate of the canvas may be determined according to a third formula listed below:

the third formula is expressed as: scaleY=sin (α).

Wherein, scaleY represents the scaling rate of the canvas.

Specifically, as shown in FIG. 7, the distance between point a and point b is the Y-axis height of the item at a certain point in a visible region, and a ratio of the distance between point a and point b to the textHeight is the scaling rate scaleY of the canvas.

Figure 11:
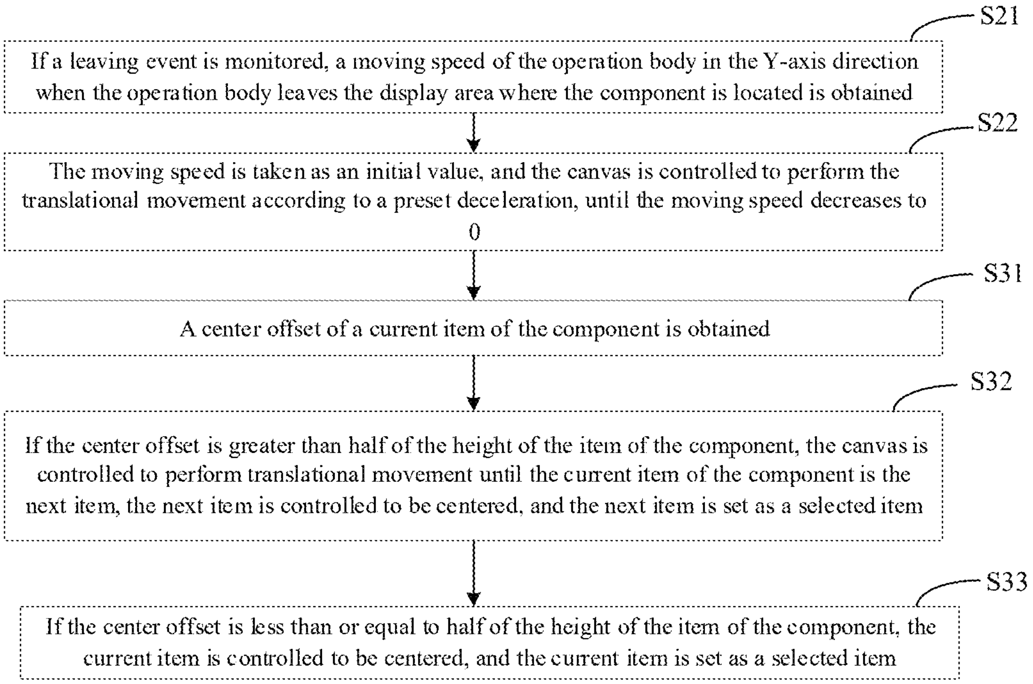
FIG. 11 illustrates some additional steps subsequent to the step of controlling the canvas to perform translational movement according to the moving distance, and scaling the canvas according to the scaling rate simultaneously, drawing and displaying the item-to-be-displayed on the canvas.

In some embodiments, on the basis of the embodiment of the method for displaying information shown in FIG. 1, with reference to FIG. 11, after the step S140 of controlling the canvas to perform translational movement according to the moving distance, and scaling the canvas according to the scaling rate simultaneously, drawing and displaying the item-to-be-displayed on the canvas, the method may further include following steps:

At step S21, if a leaving event is monitored, a moving speed of the operation body in the Y-axis direction when the operation body leaves the display area where the component is located is obtained. The leaving event is used to indicate that the operation body leaves the display area where the component is located.

At step S22, the moving speed is taken as an initial value, and the canvas is controlled to perform the translational movement according to a preset deceleration, until the moving speed decreases to 0.

In this embodiment of the present application, the moving speed of the finger in the Y-axis direction when the finger leaves the display area where the component is located is obtained, the canvas is controlled to perform translational movement according to the preset deceleration by taking the moving speed as the initial value, for example, decreasing by 40 pixels every 20 milliseconds, such that the component is continued to perform inertial sliding for a certain distance.

It should be understood that, the component may be controlled to perform inertial sliding according to the step 21 and the step 22, when the finger leaves the display area where the component is located, the component does not stop sliding immediately, so that the visual experience of the user may be improved.

In some embodiments, based on the embodiment of the method for displaying information shown in FIG. 1, with reference to FIG. 11, after the step 22, the method may further include the following steps:

- at step S31, a center offset of a current item of the component is obtained;
- at step S32, if the center offset is greater than half of the height of the item of the component, the canvas is controlled to perform translational movement until the current item of the component is the next item, the next item is controlled to be centered, and the next item is set as a selected item;
- at step 33, if the center offset is less than or equal to half of the height of the item of the component, the current item is controlled to be centered, and the current item is set as a selected item.

It should be understood that, when the moving speed decreases to 0, the inertial sliding of the component is stopped, at this time, the current item may not be centered. In this condition, the current item may be centered through the steps 31, the step 33 and the step 33, and the current item is set as the selected item, so as to further improve the user experience.

In this embodiment of the present application, in order to enable the user to see whether the current item is centered clearly, two split lines may be fixed on the component, and a distance between the two split lines is H, by calculation, a position of a first split line is equal to (D−H)/2, and a position of a second split line is equal to (D+H)/2, as shown in FIG. 4.

In addition, in this embodiment of the present application, a plurality of numeral selection components may be combined to generate a multi-digit combined component, every two numeral selection components may be bound and numerically linked.

For example, a voltage range of a digital power supply is set as 250-750V, and the minimum precision of unit digit is κV.

A minimum value of the combined component is set as 250, a maximum value of the combined component is set as 750, a number that can be selected by the first component ranges from 2 to 7, a number that can be selected by the second component ranges from 0 to 9, and a number that can be selected by the third component is κ or 5.

When 250V is selected, and the number selected by the first component is 2, the number that can be selected by the second component ranges from 5 to 9; when the number selected by the second component is κ, the number that can be selected by the third component is only 0 and the third component is not slidable.

Similarly, when 750V is selected, and when the number selected by the first component is 7, the number that can only be selected by the second component ranges from 0 to 5. When the number selected by the second component is 5, the number that can only be selected by the third component is 0, and the third component is not slidable.

Regarding other conditions, items of the second component and the third component are reset.

Figure 8:
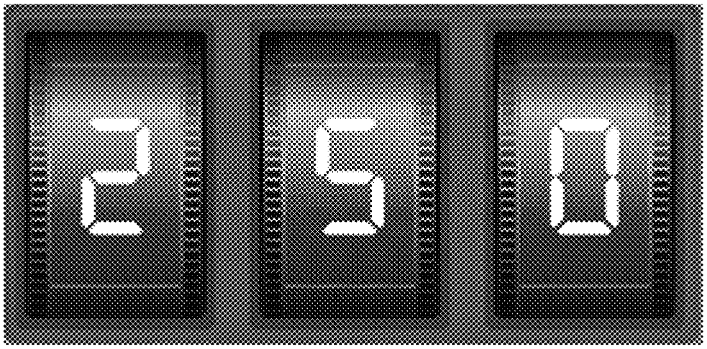
FIG. 8 illustrates a schematic diagram of a combined display effect of three components provided in one embodiment of the present application.

A detailed display effect is shown in FIG. 8.

Figure 9:
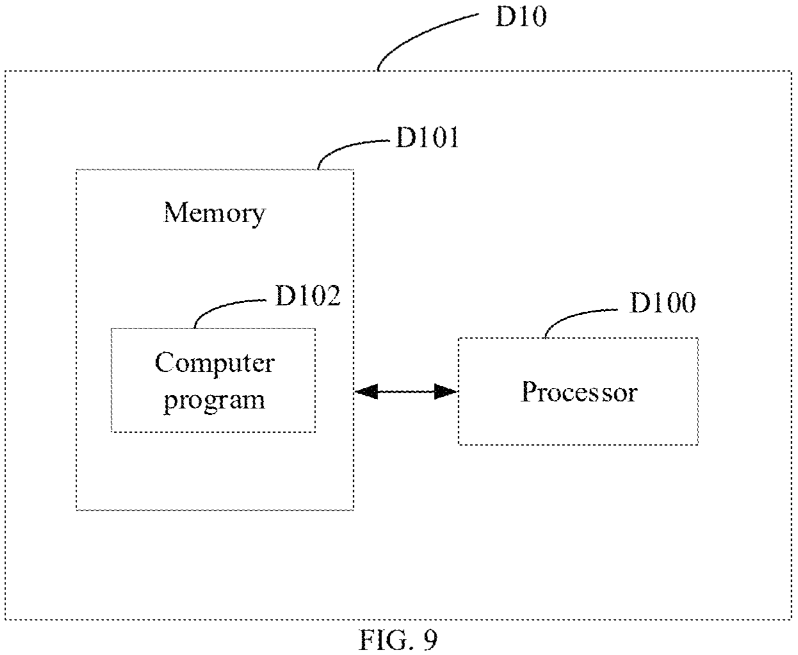
FIG. 9 illustrates a schematic structural diagram of an electronic device provided in one embodiment of the present application.

FIG. 9 illustrates a schematic structural diagram of an electronic device according to one embodiment of the present application. As shown in FIG. 9, the electronic device D10 in this embodiment includes: at least one processor D100 (only one processor shown in FIG. 10), a memory D101, and a computer program D102 stored in the memory D 101 and executable by the at least one processor D100. The processor D100 is configured to implement the steps in any one of the method embodiments when executing the computer program D102.

In some embodiments, the processor D100 is configured to, when executing the computer program D102, implement the following steps:

- obtaining a total sliding distance of an operation body, wherein the total sliding distance is a movement distance of the operation body in a Y-axis direction of a display area where a component is located;
- determining an item-to-be-displayed of the component according to the total sliding distance;
- determining a movement distance of a canvas of the component in the Y-axis direction and a scaling rate of the canvas according to the total sliding distance and a height of the item-to-be-displayed; and
- controlling the canvas to perform a translational movement according to the movement distance and scaling the canvas according to the scaling rate simultaneously, drawing and displaying the item-to-be-displayed on the canvas.

Preferably, the processor D100 may be further configured to execute the computer program D102 to determine the moving distance of the canvas of the component in the Y-axis direction and the scaling rate of the canvas according to the total sliding distance and the height of the item-to-be-displayed by performing the following steps:

- determining a radian of the item-to-be-displayed based on the total sliding distance and the height of the item-to-be-displayed;
- determining the movement distance of the canvas in the Y-axis direction based on the radian of the item-to-be-displayed and the height of the item-to-be-displayed; and
- determining the scaling rate of the canvas based on the radian of the item-to-be-displayed.

Preferably, the processor D100 may be further configured to execute the computer program D102 to implement said determining the radian of the item-to-be-displayed based on the total sliding distance and the height of the item-to-be-displayed by performing the following steps:

determining a radian of the item-to-be-displayed according to a first formula listed below:

the first formula is expressed as: $\alpha=(H\times counter-totalScrollY\ \%\ H)/(H\times 2/\pi)$;

wherein, α represents the radian of the item-to-be-displayed, H represents the height of the item-to-be-displayed, totalScrollY represents the total sliding distance of the operation body in the Y-axis direction of the display area where the component is located, and counter represents a value of a drawing point.

Preferably, the processor D100 may be further configured to execute the computer program D102 to implement the step of determining the movement distance of the canvas in the Y-axis direction based on the radian of the item-to-be-displayed and the height of the item-to-be-displayed by performing following steps:

determining the movement distance of the canvas in the Y-axis direction according to a second formula listed below:

$$ty = R - aO - ba;$$

wherein, ty represents the movement distance of the canvas in the Y-axis direction, R=H×2/π, ba−sin (α)textHeight/2, aO=cos (α)×R, or aO=−cos (α)×R, textHeight represents a text height of the item-to-be-displayed.

Preferably, the processor D100 may be further configured to execute the computer program D102 to implement the step of determining the scaling rate of the canvas according to the radian of the item-to-be-displayed by performing following steps:

determining the scaling rate of the canvas according to a third formula listed below:

$$scaleY = \sin(\alpha);$$

wherein, scaleY represents the scaling rate of the canvas.

Preferably, after the processor D100 executes the computer program D102 to implement the step of controlling the canvas to perform the translational movement according to the movement distance and scaling the canvas according to the scaling rate simultaneously, drawing and displaying the item-to-be-displayed on the canvas, the processor D100 is further configured to perform the following steps:

obtaining, if a leaving event is detected, a movement speed of the operation body on the Y-axis when the operation body leaves from the display area where the component is located, wherein the leaving event is used to indicate that the operation body leaves from the display area where the component is located;

controlling, by using the movement speed as an initial value, the canvas to perform the translational movement according to a preset deceleration until the movement speed decreases to 0.

Preferably, after the processor D100 executes the computer program D102 to implement the step of controlling, by using the movement speed as the initial value, the canvas to perform the translational movement according to the preset deceleration until the movement speed decreases to 0, the processor D100 is further configured to perform the following steps:

obtaining a center offset of a current item of the component;

controlling, if the center offset is greater than half of the height of the item of the component, the canvas to perform the translational movement until the current item of the component becomes a next item, controlling the next item to be centered, and setting the next item as a selected item; or alternatively, controlling, if the center offset is less than or equal to half of the height of the item of the component, the current item to be centered and setting the current item as the selected item.

An electronic device D10 is further provided in the embodiments of the present application, the electronic device D10 includes a memory D101, a processor D100 and a computer program stored in the memory D101 and executable by the processor D100. When the computer program is executed by the processor D100, the processor D100 is caused to implement the method for displaying information in the various method embodiments. The electronic device D10 can be a computing device such as a desktop computer, a laptop computer, a palm computer, a cloud server, etc. The electronic device D10 may include but is not limited to a processor D100, a memory D101. A person of ordinary skill in the art can understand that, FIG. 10 is only one example of the electronic device D10, but should not be constituted as limitation to the electronic device D10, more or less components than the components shown in FIG. 10 may be included. As an alternative, some components or different components may be combined; for example, the electronic device D10 can also include an input and output device, a network access device, etc.

The so-called processor D100 may be central processing unit (CPU), and may also be other general purpose processor, digital signal processor (DSP), application specific integrated circuit (ASIC), field-programmable gate array (FGPA), or some other programmable logic devices, discrete gate or transistor logic device, discrete hardware component, etc. The general purpose processor may be a microprocessor, as an alternative, the processor may also be any conventional processor, or the like.

The memory D101 may be an internal storage unit of the electronic device D10, such as a hard disk or a memory of the electronic device D10. In some other embodiments, the memory D101 may also be an external storage device of the electronic device D10, such as a plug-in hard disk, a SMC (Smart Media Card), a SD (Secure Digital) card, a FC (Flash Card) equipped on the electronic device D10. Furthermore, the memory D101 may not only include the internal storage unit of the electronic device D10 but also include the external memory of the electronic device D10. The memory D101 is configured to store operating systems, application programs, BootLoader, data and other procedures, such as procedure codes of the computer program, etc. The memory D101 may also be configured to store data that has been output or being ready to be output temporarily.

It needs to be noted that, since the contents including information interaction and the execution process between the devices/units, and the method embodiments of the present application are based on the same concept, regarding the specific functions and the technical effects achieved by the functions, reference can be made to the method embodiments. The contents are not repeatedly described herein.

The person of ordinary skill in the art may clearly understand that, for the convenience of illustration and for conciseness, the dividing of the aforesaid various functional units is merely described as examples. In an actual application, the aforesaid functions may be assigned to functional units and modules to be accomplished. That is, an inner structure of the device is divided into different functional units or modules for accomplishing the whole or a part of functionalities described above. The various functional units and modules in the embodiments may be integrated into a processing unit, or alternatively, each of the units exists independently and physically. As an alternative, two or more than two of the units are integrated into a single unit. The aforesaid integrated units may either by actualized in the form of hardware or in the form of software functional units. In addition, the specific names of the various functional units and modules are only used to be distinguished from each other conveniently, rather than being used for limiting the protection scope of the present application. Regarding the specific working process of the units and the modules in the device, reference can be made to the corresponding process in the method embodiments. This specific working process of the units and the modules is not repeatedly described herein.

A non-transitory computer-readable storage medium is further provided in the embodiments of the present application, the computer-readable storage medium stores a computer instruction, that, when being executed by the processor D100 of the electronic device D10, causes the processor D100 of the electronic device D10 to perform the steps in the various method embodiments.

A computer program product is further provided in the embodiments of the present application, when the computer program product is executed by the electronic device D10, the electronic device D10 is caused to implement the steps in the various method embodiments.

When the integrated units are achieved in the form of software functional units, and is sold or used as an independent product, the integrated units may be stored in a computer-readable storage medium. Based on this understanding, a whole or part of flow process for implementing the method in the embodiments of the present application can also be accomplished in the manner of using computer program to instruct relevant hardware. When the computer program is executed by the processor, the steps in the various method embodiments described above may be implemented. Wherein, the computer program includes computer program codes, which may be in the form of source code, object code, executable documents or some intermediate form, etc. The computer readable medium may at least include: any physical equipment or device that can carry the computer program codes to a photographing device/a terminal device, recording medium, computer memory, ROM (Read-Only Memory), RAM (Random Access Memory), electrical carrier signal, telecommunication signal and software distribution medium, such as USB flash disk, mobile hard disk drive, diskette or optical disk. In the embodiments of the present application, the descriptions of the embodiments in the present application are emphasized respectively, regarding the part in some embodiments which is not described in detail, reference can be made to related descriptions in other embodiments.

The person of ordinary skill in the art may understand that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

In some embodiments provided by the present application, it should be understood that the disclosed apparatus/device and the method may be achieved in other manners. For example, the aforementioned apparatus/device embodiments are schematic merely, for example, the division of the aforementioned modules/units is just one kind of logic function division, some other divisions may be used in actual implementations. For example, a plurality of units or components may be combined or integrated into another system, or some features may be ignored or unexecuted. In another aspect, the interacted coupling or directly coupling or communication connection displayed or discussed may be indirect coupling or communication connection via some ports, apparatus or units, and the connection may be in the form of electrical, mechanical, or other types.

The units described as separate components can be or cannot be physically separate, the components shown as units may be or may not be physical units, the components may be located in one place, or be distributed onto multiple network elements. A part or a whole of the elements can be selected to achieve the objective of the technical solution of this embodiment according to the actual requirement.

The aforesaid embodiments are only intended to explain but not to limit the technical solutions of the present application. Although the present application has been explained in detail with reference to the above-described embodiments, the person of ordinary skill in the art should understand that, the technical solutions described in each of the above-described embodiments can still be amended, or alternatively, some technical features in the technical solutions may be replaced equivalently. These amendments or equivalent replacements do not make the essence of corresponding technical solution to deviate from the spirit and the scope of the technical solution in various embodiments of the present application, and thus should all be included in the protection scope of the present application.

The invention claimed is:

1. A method for displaying information, being performed by an electronic device, the method comprising:

obtaining a total sliding distance of an operation body, wherein the total sliding distance is a movement distance of the operation body in a Y-axis direction of a display area where a component is located, the component is a NumberPicker;

determining an item-to-be-displayed of the component according to the total sliding distance;

determining a movement distance of a canvas of the component in the Y-axis direction and a scaling rate of the canvas according to the total sliding distance and a height of the item-to-be-displayed; and controlling the canvas to perform a translational movement according to the movement distance and scaling the canvas according to the scaling rate simultaneously, and drawing and displaying the item-to-be-displayed on the canvas;

wherein said determining the movement distance of the canvas of the component in the Y-axis direction and the scaling rate of the canvas based on the total sliding distance and the height of the item-to-be-displayed comprises:

determining a radian of the item-to-be-displayed based on the total sliding distance and the height of the item-to-be-displayed;

determining the movement distance of the canvas in the Y-axis direction based on the radian of the item-to-be-displayed and the height of the item-to-be-displayed; and determining the scaling rate of the canvas based on the radian of the item-to-be-displayed.

2. The method according to claim 1, wherein said determining the radian of the item-to-be-displayed based on the total sliding distance and the height of the item-to-be-displayed comprises:

determining the radian of the item-to-be-displayed according to a first formula which is expressed as:

$$\alpha=(H\times\text{counter}-\text{totalScrollY}\ \%\ H)/(H\times 2/\pi);$$

wherein, α represents the radian of the item-to-be-displayed, H represents the height of the item-to-be-displayed, totalScrollY represents the total sliding distance of the operation body in the Y-axis direction of the display area where the component is located, and counter represents a value of a drawing point.

3. The method according to claim 2, wherein said determining the movement distance of the canvas in the Y-axis direction according to the radian of the item-to-be-displayed and the height of the item-to-be-displayed comprises:

determining the movement distance of the canvas in the Y-axis direction according to a second formula which is expressed as:

$$ty=R-aO-ba;$$

wherein, ty represents the movement distance of the canvas in the Y-axis direction, R=H×2/π, ba=sin (α)textHeight/2, aO=cos (α)×R, or aO=−cos (α)×R, textHeight represents a text height of the item-to-be-displayed.

4. The method for displaying information according to claim 3, wherein said determining the scaling rate of the canvas based on the radian of the item-to-be-displayed comprises:

determining the scaling rate of the canvas according to a third formula which is expressed as:

$$scaleY=\sin(\alpha);$$

wherein scaleY represents the scaling rate of the canvas.

5. The method according to claim 4, wherein after said controlling the canvas to perform the translational movement according to the movement distance and scaling the canvas according to the scaling rate simultaneously, and drawing and displaying the item-to-be-displayed on the canvas, the method further comprises:

obtaining, if a leaving event is detected, a movement speed of the operation body on the Y-axis when the operation body leaves from the display area where the component is located, wherein the leaving event is used to indicate that the operation body leaves from the display area where the component is located;

controlling, by using the movement speed as an initial value, the canvas to perform the translational movement according to a preset deceleration until the movement speed decreases to 0.

6. The method according to claim 5, wherein after said controlling, by using the movement speed as the initial value, the canvas to perform the translational movement according to the preset deceleration until the movement speed decreases to 0, the method further comprises:

obtaining a center offset of a current item of the component;

controlling, if the center offset is greater than half of the height of the current item of the component, the canvas to perform the translational movement until the current item of the component becomes a next item, controlling the next item to be centered, and setting the next item as a selected item; or alternatively, controlling, if the center offset is less than or equal to half of the height of the current item of the component, the current item to be centered and setting the current item as the selected item.

7. An electronic device, comprising a memory, a processor and a computer program, that, when executed by the processor of the electronic device, causes the processor of the electronic device to implement the method for displaying information according to claim 1.

8. A non-transitory computer-readable storage medium which stores a computer instruction, that, when executed by a processor of an electronic device, causes the processor of the electronic device to perform the method for displaying information according to claim 1.

* * * * *